July 12, 1938.  W. H. BAKER  2,123,595
LOOM
Filed Oct. 3, 1935  14 Sheets-Sheet 1

INVENTOR.
William H. Baker.

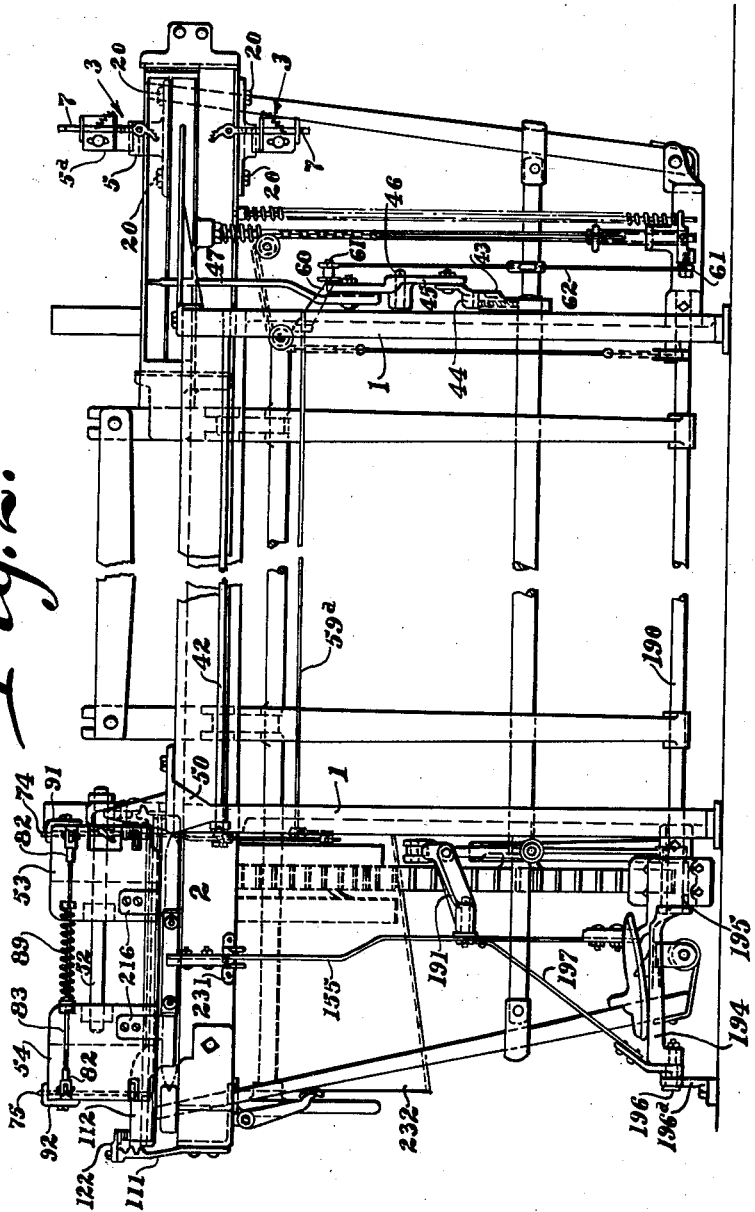

July 12, 1938.　　　W. H. BAKER　　　2,123,595
LOOM
Filed Oct. 3, 1935　　　14 Sheets-Sheet 3

INVENTOR.
William H. Baker.

July 12, 1938.   W. H. BAKER   2,123,595
LOOM
Filed Oct. 3, 1935   14 Sheets-Sheet 4

INVENTOR.
William H. Baker,

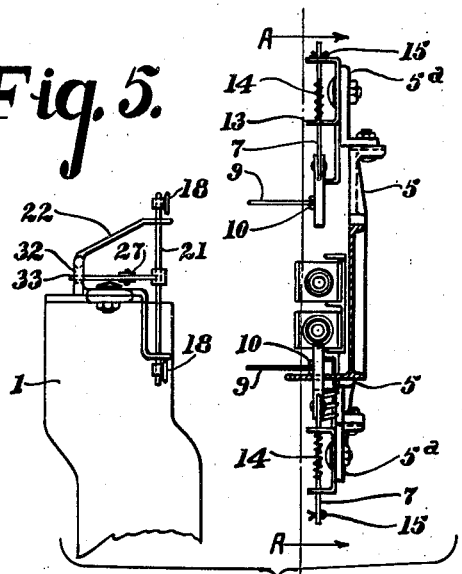
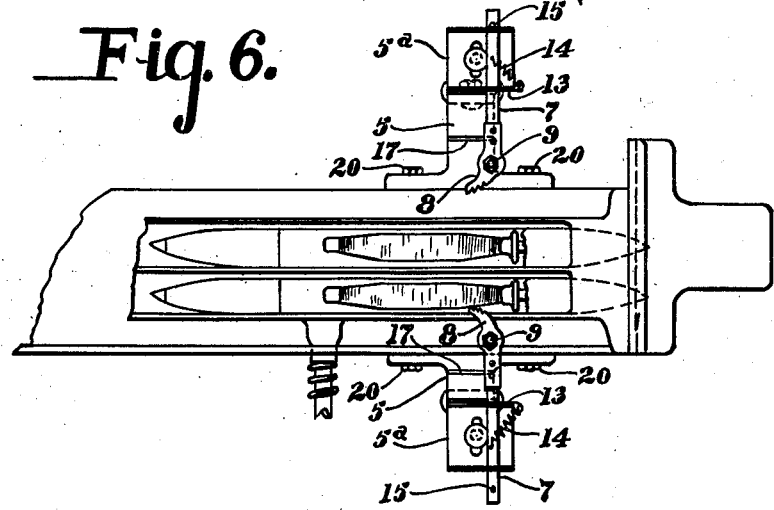

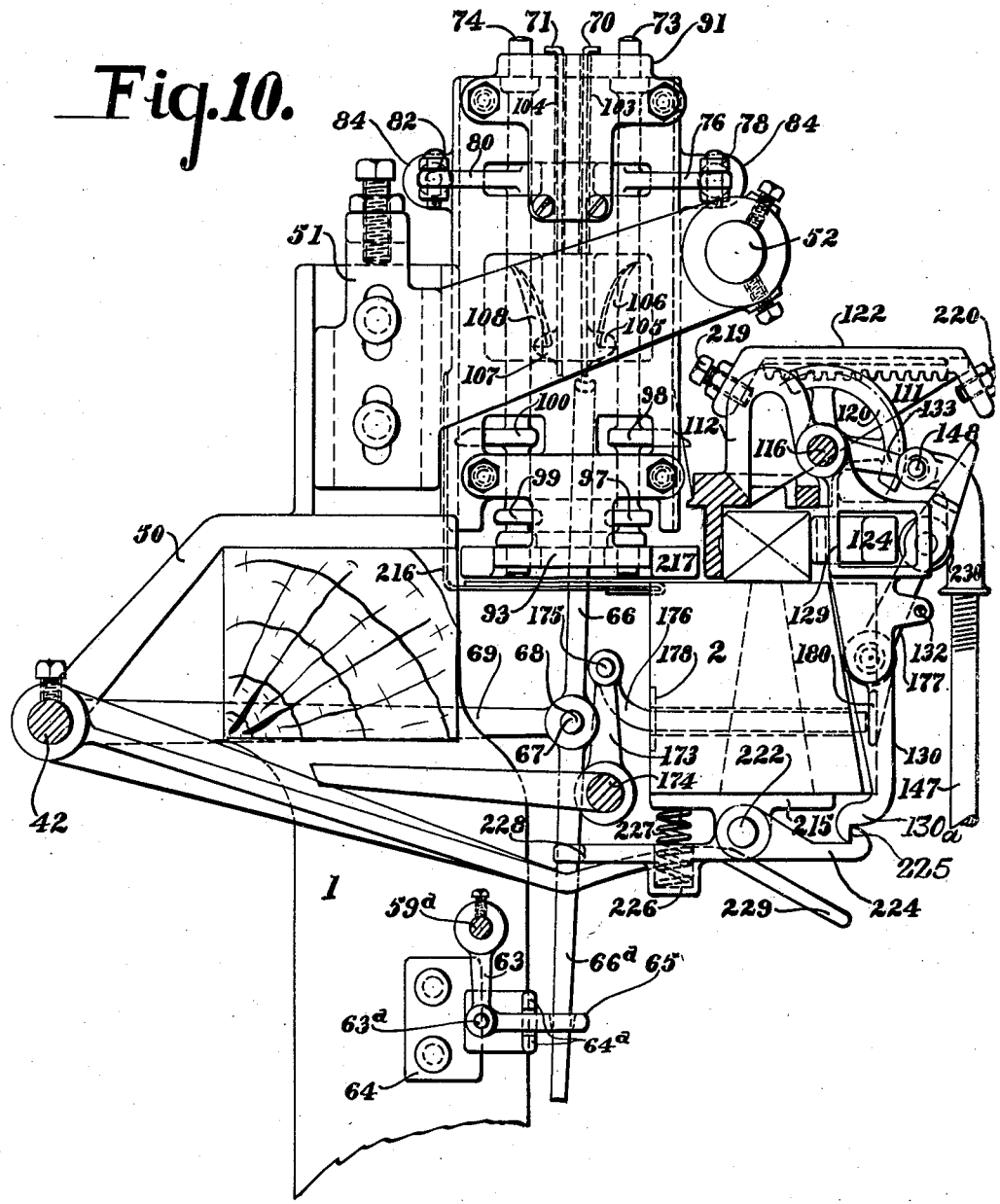

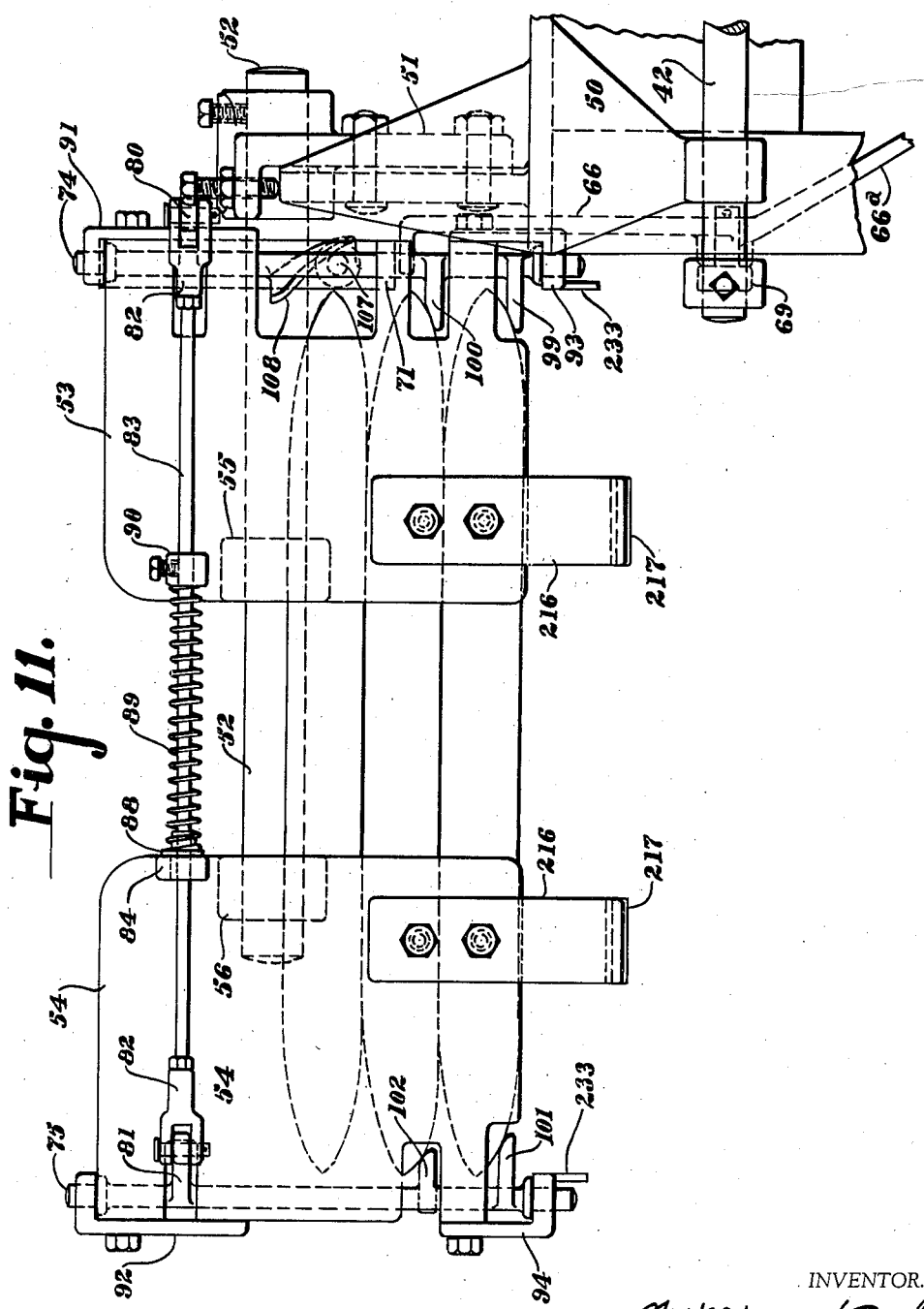

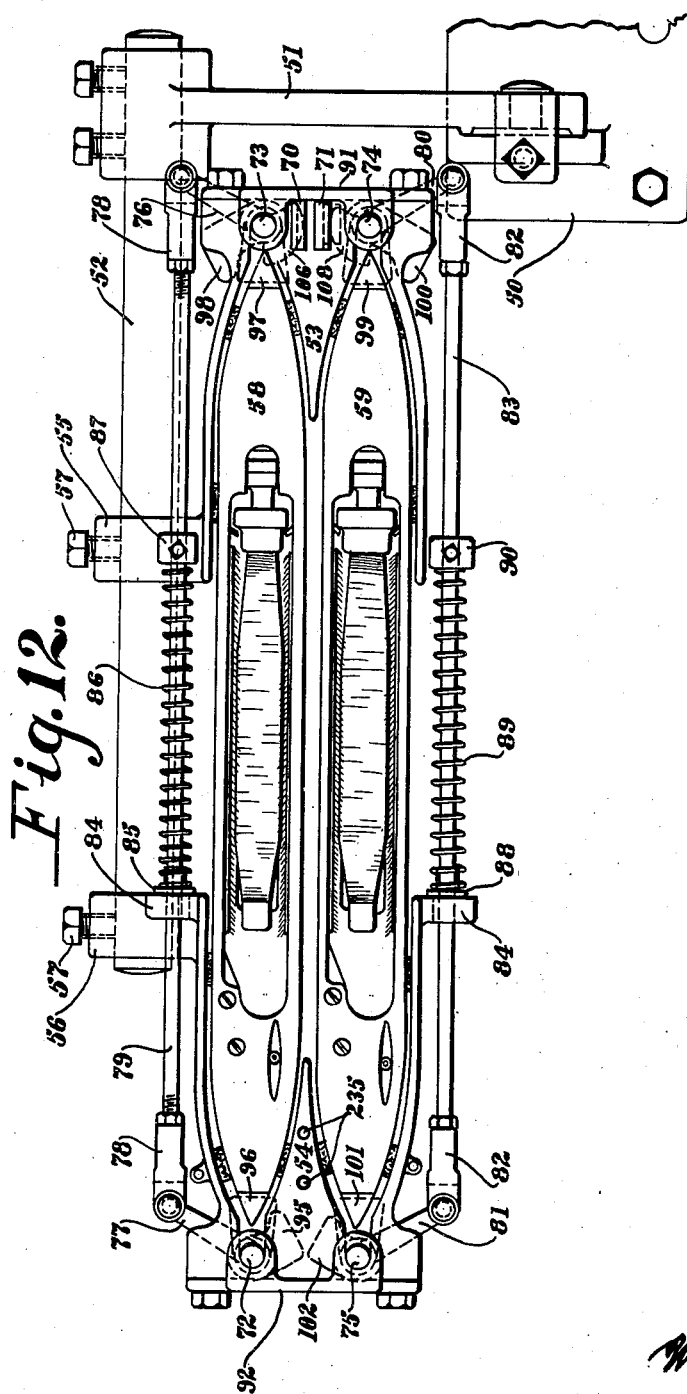

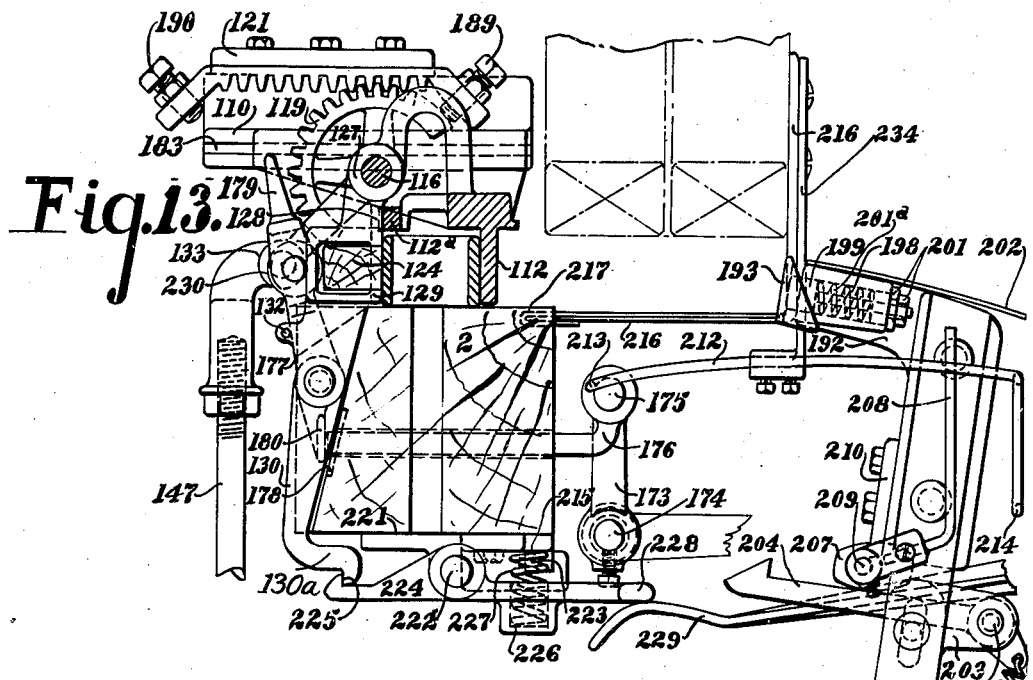

July 12, 1938.  W. H. BAKER  2,123,595
LOOM
Filed Oct. 3, 1935   14 Sheets-Sheet 12

INVENTOR.
William H. Baker.

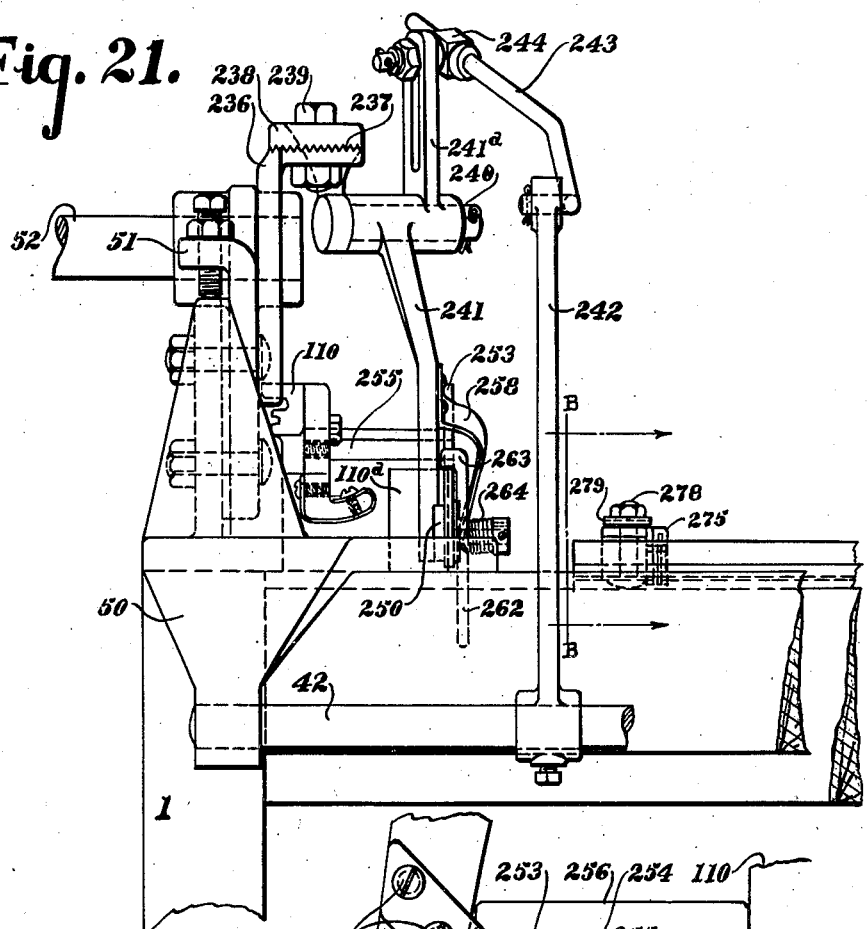
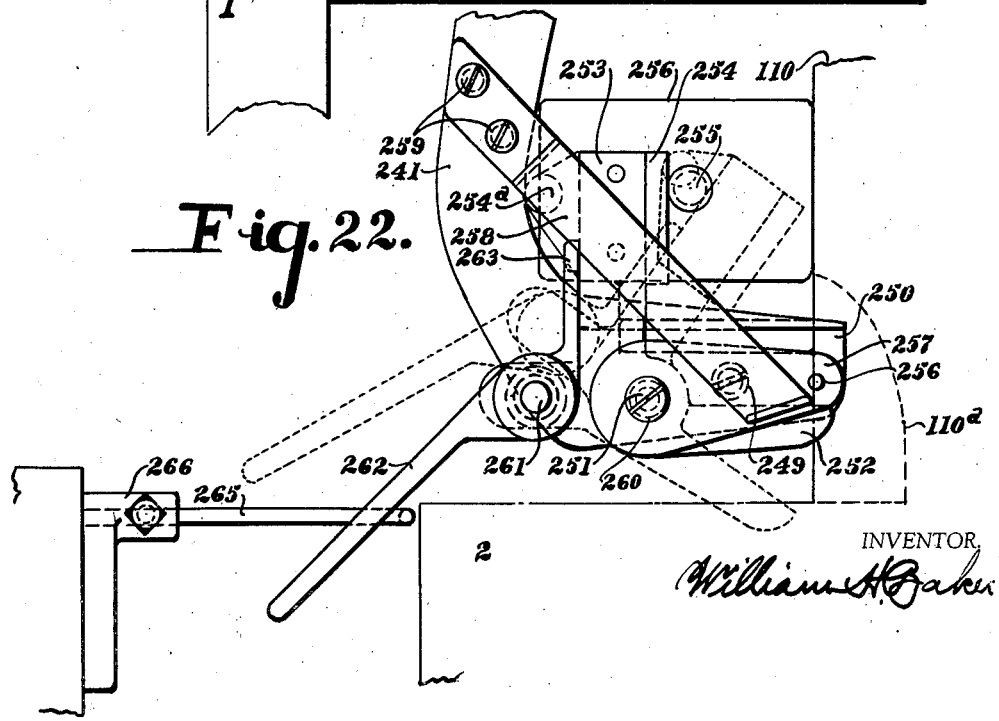

INVENTOR.
William H. Baker.

Patented July 12, 1938

2,123,595

UNITED STATES PATENT OFFICE 2,123,595

LOOM

William H. Baker, Montreal, Quebec, Canada

Application October 3, 1935, Serial No. 43,398

9 Claims. (Cl. 139—232)

This invention relates to automatic looms, and especially to the class where the weft carrier, or shuttle is discarded with the spent weft bobbin.

In the preferred form of the invention shown, the loom can be operated as a weft mixing loom, mixing the weft two shots from each shuttle from a plurality of shuttles. The loom has a box motion at one end of the lay, having a plurality of shuttle cells, and a single box at the other end of the lay where the shuttles are changed.

A plurality of feelers are located at the box motion end of the lay, and a shuttle magazine having a plurality of compartments for shuttles adjacent to the other end of the lay, also means for discarding the spent shuttle for a replenished one from the magazine on that end of the lay.

There is also provided a selector mechanism controlled by the box motion operating mechanism for determining from which compartment in the shuttle magazine the next full shuttle will be taken to replace the spent shuttle running in the loom.

My invention further relates to arrangements and combinations of parts which will be hereinafter described and more particularly pointed out in the appended claims.

This approved version of the invention also applies to the class of weaving where a plurality of kinds of weft are to be employed as indicated in the following description.

In the accompanying drawings:—

Fig. 2 is a front elevation.

Fig. 5 is a fragmentary end view showing the feelers.

Fig. 6 is a fragmentary elevation view showing the feelers.

Fig. 10 is a detailed end view of the shuttle magazine, also showing the shuttle box partly in section.

Fig. 11 is a detailed front elevation of Fig. 10 without the shuttle box.

Fig. 12 is a plan view of Fig. 11.

Fig. 13 is a section on line A—A in Fig. 14 showing the shuttle box closed.

Fig. 17 is a section on line A—A in Fig. 14 showing the shuttle box open.

Fig. 21 is a front elevation of Fig. 18.

Fig. 22 is an enlarged side view of the weft cutter mechanism.

Figure 7:
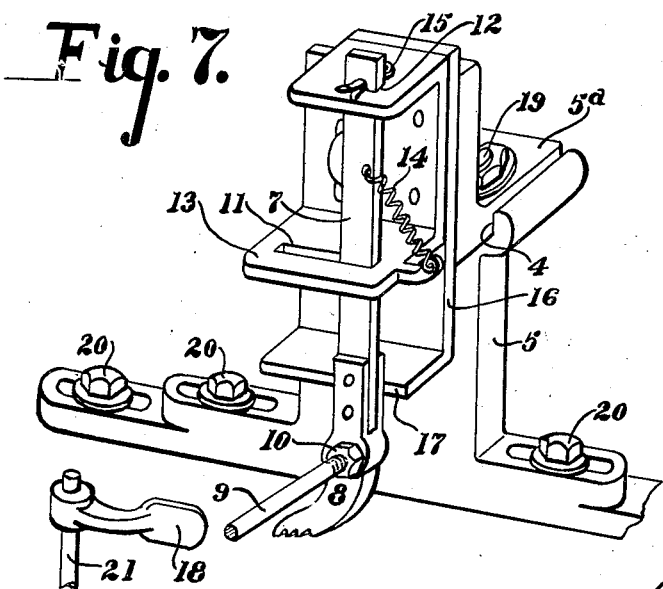
Fig. 7 is a perspective view of the feeler.

Referring more particularly to the drawings, Figs. 2-5 and 6, 1 is the loom frame, 2 the lay, 3 the feelers mounted in guides suitably fastened to the brackets 5 and 5a, by the bolts 20, one above the shifting two celled shuttle box, the other below the aforesaid shuttle box, and mounted on the back of the lay end in such a manner as to allow the upper feeler to enter the top of the shuttle in the upper box cell to contact the weft in that shuttle, and the other mounted to enter through the bottom of the shuttle in the lower box to contact the weft in this shuttle. Fig. 7 is a general perspective of the feeler in which 7 is the feeler bar with the tip 8 of indurated material and the striker pin 9 threaded therein, and can be adjustably held by the check nut 10 on the front side of the feeler tip. The feeler bar 7 is confined in the guide piece 13 by the slots 11 and 12. The light spring 14 positions the part against lateral movement, and the pin 15 limits the end movement toward the weft bobbin. The guide piece 13 has a reinforced part 16, shown as being attached to the back thereof and having an exposed edge 17 positioned just behind the indurated feeler tip as it moves, to form a support to same when the striker pin 9 strikes the striker plate 18, and remove the strain from the relatively light bearing slot 11 at the lower extremity of the guide, when the feeler has indicated a weft change. The feeler bracket is made in two parts 5 and 5a with an adjustable slide 4 between the two members and is united by the bolt 19. This slide 4 is to admit for lateral adjustment to position the feeler directly over the axis of the bobbin, and a longitudinal position can be had by moving the bracket along the lay back 2 and clamping in place by the screws 20.

The contacting end of the feeler tip 8 has the usual serrations or teeth which can be of any suitable shape to operate with the type of weft used. With the feeler parts assembled as described the correct position for same is formed and securely held by screws 20 and 19.

Figure 9:
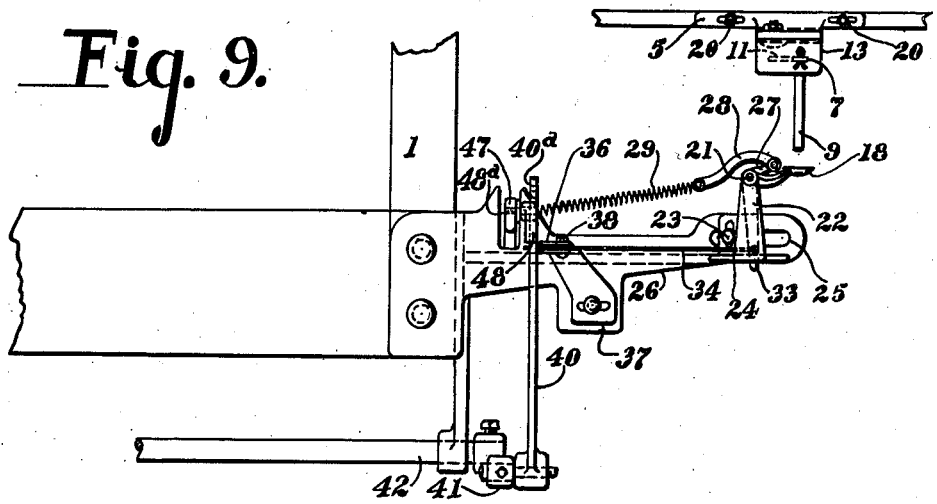
Fig. 9 is a fragmentary plan view of Fig. 8.
Figure 8:
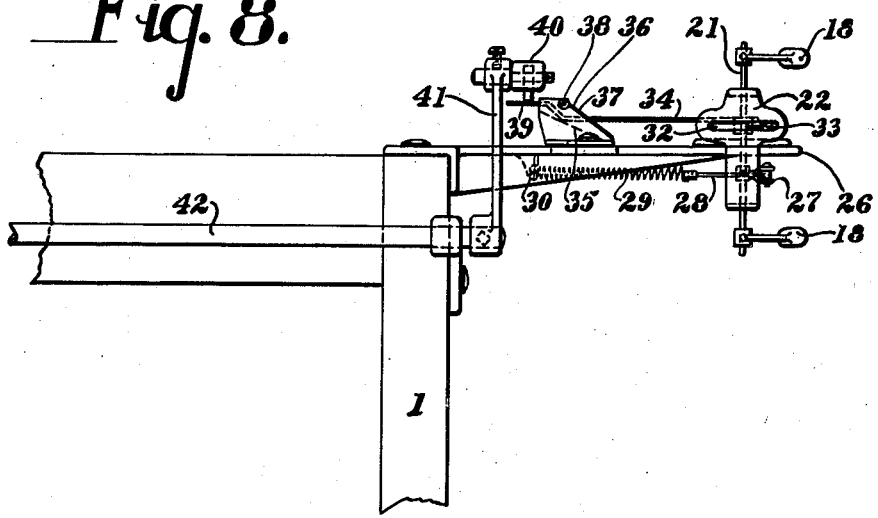
Fig. 8 is a front elevation of the indicating device.

Referring to Figs. 8 and 9, the striker plates 18 are mounted on the shaft 21 fulcrumed in the bracket 22 and attached to the loom by the bolt 23 in the adjusting slot 24 in the bracket, and 25 in the loom frame member 26. Mounted on the shaft 21 is the arm 27 to which is connected the curved link 28, the free end of this link is attached to a light spring 29 which is in turn anchored at 30 to the bracket 26 or other convenient support by the spring cotter or other means in such a manner that the tension of the spring will tend to hold the stop finger 33 located on the shaft 21, against one end of the slot 32 in the bracket 22 in released or running position and against the other end of the slot when the feeler has indicated a weft change by contacting a striker plate 18 due to a weft bobbin being depleted to a predetermined extent. The arm 27 being set to swing across by force of the spring 29 from one side of the shaft 21 in released position to the other side of the shaft for indicating position. The stop finger 33 is screwed to the shaft 21 to impart endwise movement to the latch lifter wire 34. This latch lifter wire 34 is bent angularly at the opposite end and adapted to slide up an incline 35 in the bottom of the slot or guide 36 in the bracket 37 which is bolted to a fixed part of the loom, and has a pin 38 across the slot 36 to prevent the lifter wire 34 from accidently becoming dislodged from the said slot. Referring to Figs. 4–8 and 9, on the upper end 39 of the lifter wire 34 is the indicator latch 40 attached to the arm 41, and screwed to the cross shaft 42 the function of which is to call a weft change when required. The power to move the latch 40 when a weft change is required originates with the actuator cam 43 Fig. 4, the cam follower 44 the actuator lever 45 fulcrumed at 46 on the loom frame, and the upright extension 47 adjustably fastened to the main lever 45. There is a contacting pawl 48 fulcrumed on the pin 48a set in the upright arm 47 to contact the notched end 40a at the end of the latch 40. When the feeler calls a weft change through the indicating mechanism previously described the latch 40 is raised into position where it remains until the cam 43 on its next cycle moves the arm 47 back, allowing the pawl 48 to engage the notched end 40a. After these parts interlock the arm 47 again moves forward transmitting movement through the latch 40 and the arm 41 to the cross shaft 42. The forward movement of the arm 47 with the parts interlocked as described also causes considerable pressure to bear upon the lifter finger 47a mounted on the hinge pin 47b, sustained by the lifter wire 34. This pressure forces the lifter finger 47a down against the lifter wire 34 until the stop 47c comes to rest on the forward edge of the upright arm 47, replacing the indicating parts for the next actuation.

Fastened to the loom frame is a bracket 50 to which is adjustably bolted the main magazine stand 51 Figs. 10–11 and 12. In an arm of this stand is a shaft 52 on which the shuttle magazine members 53 and 54 are mounted, and securely held in place by the bosses 55 and 56 and the set screws 57. The magazine has two compartments 58 and 59 for shuttles as indicated, where two kinds of weft can be assembled, one kind separate from the other to supply the loom with the proper weft as the running shuttles become exhausted. For example; the shuttle space 58 can be arranged to feed shuttles into the loom so that they will always run in the lower cell of the two cell shuttle box at the other side of the loom, and shuttles in the magazine space 59 to run always in the upper cell of the shifting shuttle box at the opposite side of the loom.

Figure 1:
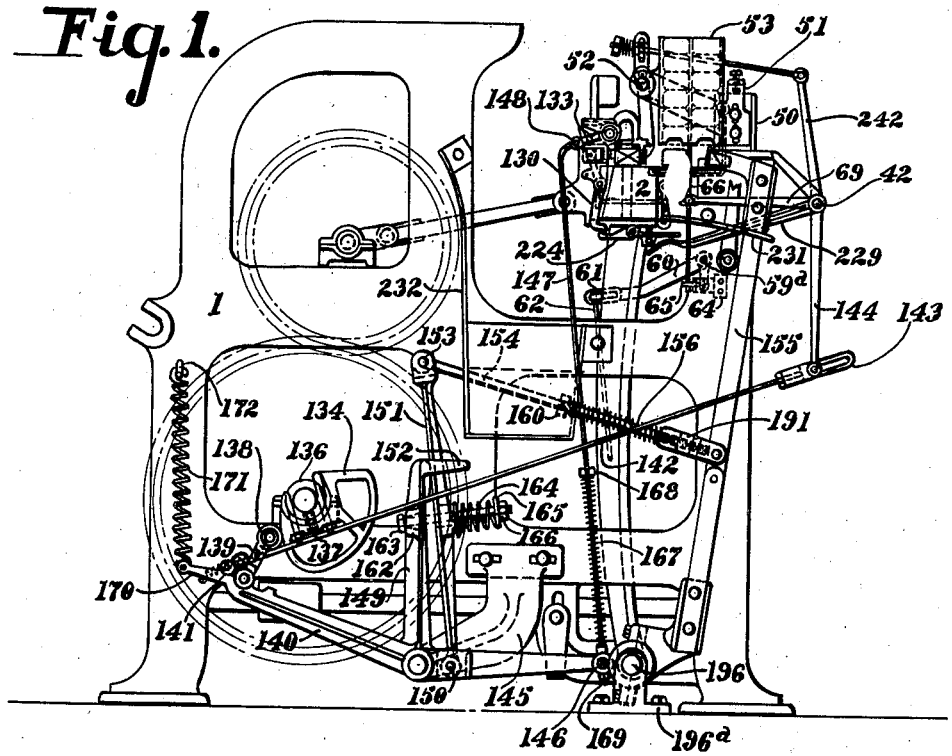
Fig. 1 is an end view.
Figure 4:
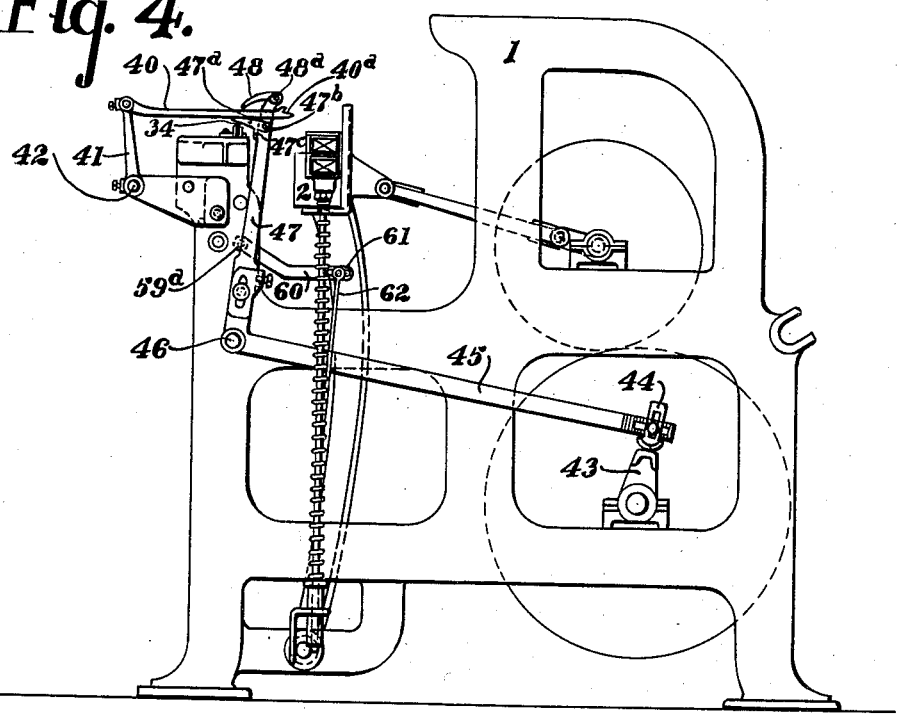
Fig. 4 is a view of the opposite end to Fig. 1.

Referring to Figs. 2–4 and 10, the selector shaft 59a is mounted in holes in the loom frame and extends across the front of the loom. On the box motion side of the loom the arm 60 Figs. 1 and 4 is positioned, and this is connected with the box motion operating levers by the stud 61 and the adjustable connecting rod 62 Fig. 2, so that the selector shaft 59a will be rocked or moved slightly each time that the box motion operating parts are moved. At the shuttle changing end of the loom, Fig. 10 this selector shaft 59a is screwed to the arm 63. On the inside of the loom frame at this point is bolted the guide bracket 64. Pivoted on arm 63 by the stud 63a is the controller guide 65, arranged to pass between the guides or ears 64a on the bracket 64. The guide 65 has an opening to receive the lower end of the selector proper 66a. This selector is fulcrumed at 67 on the shuttle release arm 69 by the stud 68. The upper end of the selector 66, Fig. 11 is turned at right angles, and extends under the shuttle release mechanism. The selector proper 66 has a downward extension 66a which fits loosely in a hole in the guide 65 causing it to swing a short distance front and back as the box motion moves. This movement causes the upper end of the selector 66 to oscillate directly below the shuttle release members 70 and 71, shown clearly in Fig. 10, as the pattern for the box motion progresses. When a change of shuttles is called, the selector 66 is lifted by the lever 69 raised by the cross shaft 42 causing one of the shuttle release members to be moved. The shuttles, Fig. 12, are held in the magazine compartment at the tips by wings 96 and 97 located on the sides of the vertical shafts 72 and 73 in the compartment 58 of the magazine, and by wings 99 and 101 on the vertical shafts 74 and 75 in compartment 59. These vertical shafts operate in pairs, shaft 73 has an arm 76 and shaft 72 has an arm 77. These arms are connected by the adjustable connectors 78 and the connecting rod 79 operating the shafts in compartment 58 in unison. Shuttle compartment 59 is equipped with the vertical shafts 74 and 75 with the arms 80 and 81 connected by the adjustable connectors 82 and the connecting rod 83 to operate this compartment. On the magazine member 54 are the ears 84 through which the connecting rods 79 and 83 pass freely. Fitting loosely on the rod 79 is the loose skirted collar 85, the compression spring 86 and the adjusting collar 87 which serve to replace the shuttle release shafts 72 and 73 after a shuttle has been released from the shuttle compartment 58. The loose skirted collar 88, the spring 89 and the adjusting collar 90 on the connecting rod 83 serve to replace the shuttle release shafts 74 and 75 after a shuttle has been delivered from the magazine in compartment 59. These release shafts 72—73—74—and 75 are held firmly in position by the bearings 91 and 92 at the top of the shuttle magazine, and by bearings 93 and 94 at the bottom, see Fig. 11. In Fig. 12 the wings are shown located at the lower ends of the shuttle release shafts. Shaft 72 has the wings 95 and 96, and shaft 73 the wings 97 and 98 all in compartment 58 of the shuttle magazine. Shaft 74 has the wings 99 and 100, and the shaft 75 has the wings 101 and 102 located in compartment 59. In this figure the parts are shown sustaining shuttles in both compartments, the bottom shuttle in compartment 58 rests on wing 97 on the shaft 73 at the inner end, and on wing 96 on the shaft 72 on the outer end. The lower shuttle in compartment 59 is sustained by wing 99 on the shaft 74 on the inner end, and by wing 101 on the shaft 75 on the outer end. The arrangement of parts for compartment 59 can be seen in elevation in Fig. 11. As it is desirable that only one shuttle drop at a time for transfer, when the wings 99 and 101 release the bottom shuttle in compartment 59, the wings 100 and 102 immediately swing under the next above shuttle to prevent same from dropping until the replenishment has been made. The procedure being the same in compartment 58, it is unnecessary to describe this operation again. Referring to the shuttle release members 70 and 71, Figs. 10 and 12, these slide in vertical grooves 103 and 104 on the outer surface of the inner end of the magazine. The member 70 has a lug 105 which contacts a spiral wing 106 on the shuttle release shaft 73 in such a manner that when this member is moved upward by the selector 66 as described, the lug 105 will press against the lower surface of the spiral wing 106, and cause the shuttle release shaft 73 to turn, and as this shaft 73 is connected to shuttle release shaft 72 at the other end of the shuttle space 58 in the magazine, through the adjustable connectors 78, and the connecting rod 79, the wing 97 on the shaft 73, and wing 96 on shaft 72 will be moved from under the tips of the lower shuttle in this compartment of the magazine, allowing this shuttle to drop out at the bottom, and the shuttle supports 98 on the shaft 73, and 95 on the shaft 72 will slip under the tips of the next above shuttle preventing it from dropping through with the first mentioned shuttle. It will be noted that these wings 97 and 98, Fig. 12, are arranged to overlap so that the supporting wing 98 will be well under the shuttle tip before wing 97 swings clear. The same procedure is repeated at the other end of the shuttle by the shuttle release shaft 72, and the supporting shelves 95 and 96 moved by the connecting arms 76 and 77 adjustable connectors 78 and the connecting rod 79. When a call is made from compartment 59 of the magazine, and the selector 66 resides under the shuttle release member 71, the same procedure will be effected through the shuttle release shafts 74 and 75 and the arms 80 and 81 adjustable connectors 82 and the connecting rod 83 all deriving their movement from the lug 107 on the release member 71 and the spiral flange 108 on the shaft 74.

Figure 14:
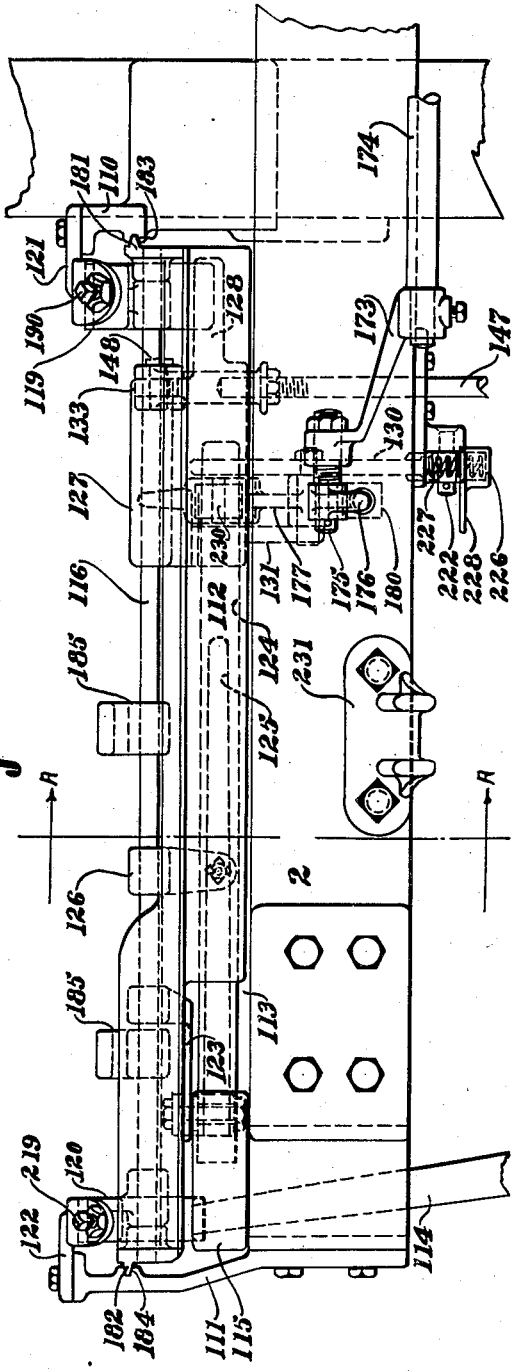
Fig. 14 is a front elevation of the shuttle box with the shuttle magazine removed.

Referring to Fig. 13, 2 shows the lay in section on line A—A Fig. 14. On the lay are mounted in fixed positions two brackets 110 and 111 Figs. 14 and 15, and sliding across the lay at this end, between these guides is the main body of the shuttle box 112. This shuttle box is cut away at 113 to allow the shuttle box to move across the lay and escape the picker stick 114 and picker 115 Fig. 14, when a spent shuttle is to be ejected to the rear in the process of changing shuttles. The shaft 116 operates in bearings 117 in the bracket 110 on the inner end, and 118 in the bracket 111 at the outer end of the lay, as shown in dotted lines Fig. 15. Keyed to this shaft or otherwise fastened, are found two gear segments 119 on the inner end meshing with the rack 121 which is held by cap screws to the main bracket 110, and segment 120 on the outer end meshing with the rack 122 which is fastened by cap screws to the bracket 111 at the outer end of the lay. Also fastened to this shaft 116 near the outer end is part 123 Fig. 15 forming a fulcrum for the binder 124 and a fastening for the binder spring 125. Next from the end on this shaft is the binder spring adjusting bracket 126 with the adjusting screw for the spring. Adjacent the gear segment on the shaft 116 is the part 127, with the box back 128, the binder guide 129, shown in Fig. 13, and the protection rod operating part 177, fulcrumed in the backward and downward extending members 130 and 131 Fig. 15. These downward extending members also contain the stop wire 132 Fig. 13 which forms a back stop for the protection rod operating part 177. The part 127 also includes the operating arm 133 which receives movement derived from the operating cam 134 Fig. 1. The cam 134 which is held on the cam shaft by the yoke bolt 136 and set screw 137, contacts the roller 138 on the arm 139 fulcrumed on the main lever 140. There is a short projection 141 on the arm 139 to which the control rod 142 is attached by a link or slot 143 to the depending arm 144 on the cross shaft 42 to operate the shuttle changing instrumentalities when a feeler has indicated an exhausted filling carrier at the other side of the loom. 145 Fig. 1, is the bearing bracket for the main operating lever. The front end of this lever terminates in a swivel 146 through which passes the connecting rod 147, which is attached to the arm 133 by the pin 148 at the top. This connecting rod 147 is curved or offset at the top to clear the shuttle tips as the spent shuttles are liberated at the back of the lay, by the rotating upward and backward movement of the parts described as being mounted on the shaft 116 Figs. 13–14 and 15.

Figure 16:
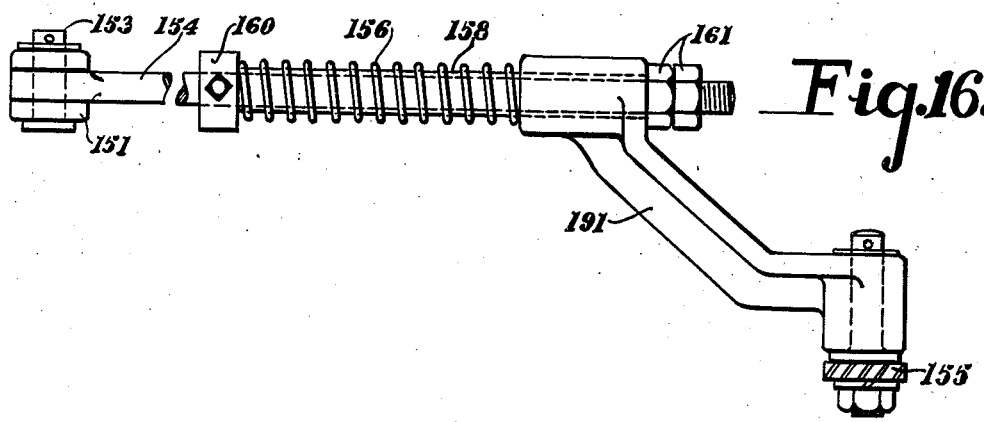
Fig. 16 is a fragmentary plan view of the shuttle placer parts.
Figure 3:
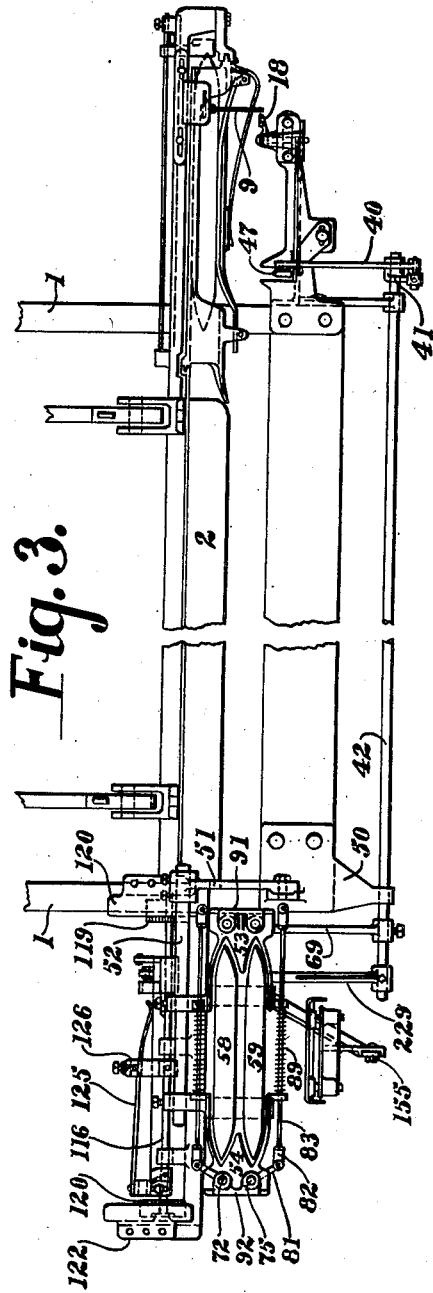
Fig. 3 is a plan view.

The relief lever 151 Fig. 1, is pivoted in the lever 140 by a pin 150 and extends upward through the guide 152 of the upright extension 149 of the lever 140, and is connected by a pin 153 at the top to the connecting rod 154 which in turn is fastened to the shuttle placer 155, furnishing the required movement to position a new shuttle on the race in the process of changing shuttles. The spring 156 Figs. 1 and 16, on the connecting rod 154 is held by the collar 160, and presses the connecting shackle 191 against the adjusting nuts 161 on the end of the connecting rod 154. The shackle 191 and the spring 156 slide on a bushing 158. This arrangement of the parts is necessary to allow the shackle 191 to slip a short distance along the connecting rod 154 after the placer 155 has been hooked to the lay, and until the placer is released, as hereinafter described. Referring again to Fig. 1 the upright extension 149 has a hole 162 in which the spring bolt 163 is seated. This bolt extends frontward through the lever 151 and the substantial relief spring 164, collar 165, and adjusting nut 166 forming a relief to prevent damage to the parts in the event that the incoming shuttle becomes misplaced or the shuttle placer mechanism for any reason fails to function. The relief spring 167 on the connecting rod 147 is held in position by the collar 168 at the top and presses against the swivel 146 at the bottom. On the bottom end of the connecting rod 147 below the swivel is a positioning collar 169 to prevent the connecting rod from escaping through the swivel by urge of this spring. This arrangement of the parts forms a relief should the outgoing shuttle become jammed or if for any other reason the shuttle box parts fail to move freely under the urge of motion received from the main operating cam 134, when the shuttles are being changed.

On the main operating lever 140 Fig. 1, at the extreme rear end is an extension 170 to form an ear to attach the main spring 171 which is anchored to the frame of the loom by the bolt 172 as shown.

Figure 15:
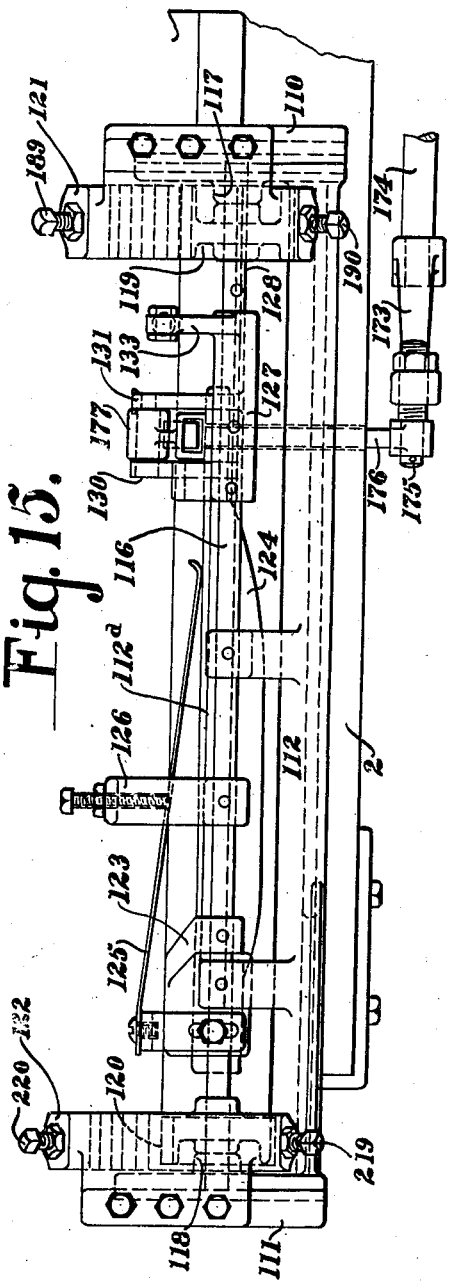
Fig. 15 is a plan view of Fig. 14.

Referring to Figs. 13–14 and 15 the protection rod arrangements are shown. 173 is a new arm on the usual protection rod 174. At the upper end of this arm 173 is a stud 175. On this stud 175 is a connecting rod 176, which is bent down slightly and extends through a hole in the lay to the back thereof where it is confined, and guided by the plate of indurated material 178 Fig. 13. Fulcrumed between the depending arms 130 and 131, Figs. 14 and 15, is the protection rod operating part or finger 177. This finger has a roller at the top to bear against the binder, and an upturned end 179 to facilitate the operation of removing and replacing by hand the shuttle in the box when required. At the lower end of this protection rod is a flat face 180, to contact the end of the connecting rod 176 to transmit movement from the binder 124 to the regular protection rod 174, to stop the loom, in the event that a shuttle should fail to box properly in this shuttle box. When this shuttle box is moved into abnormal or changing position the stop wire 132 prevents the protection finger 177 from swinging over out of position while away from the end of the connecting rod 176.

The main body of the shuttle box 112 Fig. 14, is provided with guides 181 on the inner end, and 182 on the outer end. The guide 181 slides in the groove 183 in the bracket 110, and the guide 182 slides in the groove 184 in the bracket 111. The grooves and guides in combination support the shuttle box and also allow it to move during shuttle transfer. The upper rear box guide 112a, shown in Figs. 13–15 and 17, is constructed and so positioned to hold down the shuttle in the shuttle box, thereby preventing the shuttle from contacting the upper front box guide and chafing or cutting the weft as it runs from the shuttle eye.

The placer 155 is fulcrumed at the rocking rail 190 Fig. 2, receiving its movement from the connecting rod 154, and the fitting 191 terminating at the top with the part 192 Fig. 13, with the spring cushioned delivery plate 193 adapted to receive the shuttles as they are released from the magazine and transferred to the loom. Referring to Figs. 1 and 2, 194 is the rocker iron fastened to the rocking rail 190. There is a turned shank 195 at the inner end of the rocker iron 194 to form a bearing for one leg of the placer 155, and a stud 196 at the outer end, supported by bracket 196a, to form a bearing for leg 197 of the placer. It is to be understood that these two bearings 195 and 196 are arranged in line, and the two legs of the placer turn freely upon them, making a rigid support for the placer. There is also a guide 231 mounted on the front of the lay to guide the placer during shuttle replenishment. At the top of the part 192 Fig. 13 are the holes 198 to receive the studs 199 which are fastened to the delivery plate 193. On the studs 199 are the cushioning springs 201a held by the nuts 201 on the threaded part of the studs, to limit the movement of the delivery plate under the urge of these springs. Fastened at the top of the part 192 is the shuttle protector 202 in the form of a curved sheet of steel, to prevent a shuttle from falling behind the placer in the event of an accidental dislodgment of a shuttle from the magazine while the placer is delivering a shuttle to the shuttle box.

A short distance down from the top of the shuttle placer is a fitting 203 Fig. 13, supporting a hook 204 fulcrumed at 205, and having a tensioning spring 206 to hold the hook against the cam 207 fulcrumed at 209 in the bracket 210 screwed to the placer top casting 192. This cam has an upstanding arm 208 to contact the ends 213 and 214 of the control rod 212. These parts are to hook the placer to the lay and release same at predetermined times.

Mounted on the shuttle magazine is a depending bracket 234 Fig. 13, supporting the hook controller rod 212 with the turned end 213 at the back to trip the hook from the lay when required, and a turned end at the front 214 to return the cam 207 and the hook 204 to normal position. On the under side of the lay is a detent or projection 215 in which the hook 204 engages, holding the shuttle placer to the lay during the process of changing shuttles. On the back of the shuttle magazine are two shuttle supports 216 Figs. 2 and 13, which extend down the front at each side of the shuttle placer space, and are turned backward to form a floor for the magazine. These are covered with leather or other cushioning material 217 Fig. 13, to receive and retain the shuttles when they are dropped after a weft exhaustion indication has been made by one of the feelers, and until the shuttle placer has transferred the shuttle to the race. Also extending from the bearing brackets 93 and 94 are side members 233 Fig. 11, which form surfaces at each end of the shuttle in this space below the shuttle magazine to keep the liberated shuttle confined endwise in proper position to be moved backward on to the race in front of the picker where it is picked across the loom.

It has been found necessary, in addition to the adjustable stops 189 and 190 on the rack 121, and the adjustable stops 219 and 220, on the outer rack 120, to incorporate a box locking device to insure proper operation of the protection rod 174. Referring to Figs. 1–13 and 17, there is a bracket 221 fastened to the under side of the lay near the loom side beyond the sweep of the picker stick having a fulcrum pin 222 and a spring lug 223. Mounted on the fulcrum pin 222 is the locking lever 224 with a latch 225 at the back, a spring socket 226 in which is seated the compression spring 227 to normally hold the latch in closed or locked position, and the angular operating end 228 at the front. This operating end co-operates with the unlocking lever 229 mounted on the cross shaft 42 to unlock the shuttle box 112 when a call for weft change comes from the feeler and the lay has advanced toward the front sufficiently to enable the spent shuttle to arrive in the shuttle changing box at the magazine side of the loom and lift the usual protection rod finger. On the part 127 are down turned projections 130 and 131 having a rectangular guide 129 at the top to guide the loose end of the binder 124 and bearing for the protection finger 177 with the roller at the top, Figs. 13 and 14, and the flat surface 180 at the lower end to bear against the end of the protection rod 176, which passes through the lay beam at this point to operate the protection rod 174 through the arm 173 while the loom is running normally. One of these arms or projections 130 is extended still further down and terminates in a hook shaped extremity 130a adapted to strike the rear end of the catch 225 just under the edge of the lay, and form a secure lock for the shuttle box when in normal or running position.

The spent shuttles are caught and held in the receptacle 232 shown clearly in Figs. 1 and 2, or in any other well known manner.

There are two weft cutters required with a shuttle changer of this character, one to cut the weft from the discarded or spent shuttle and another to sever the weft of the new or incoming shuttle. Figs. 18—19—20—21 and 22, show the cutter for the weft from the discarded shuttle. This cutter is adjustably mounted on the arm 51 by the bracket 236. The upper surface of this bracket 236 is provided with a hole surrounded by a ring of radial serrations or notches at 237 on which is bolted a cap 238 having like serrations to fit into those on the bracket 236, and held in place by the bolt 239. Radiating from the cap 238 is a fulcrum or journal 240 on which is mounted to swing, the body of the cutter 241 with the slotted projection 241a at the top and the cutter members at the other end.

Figure 18:
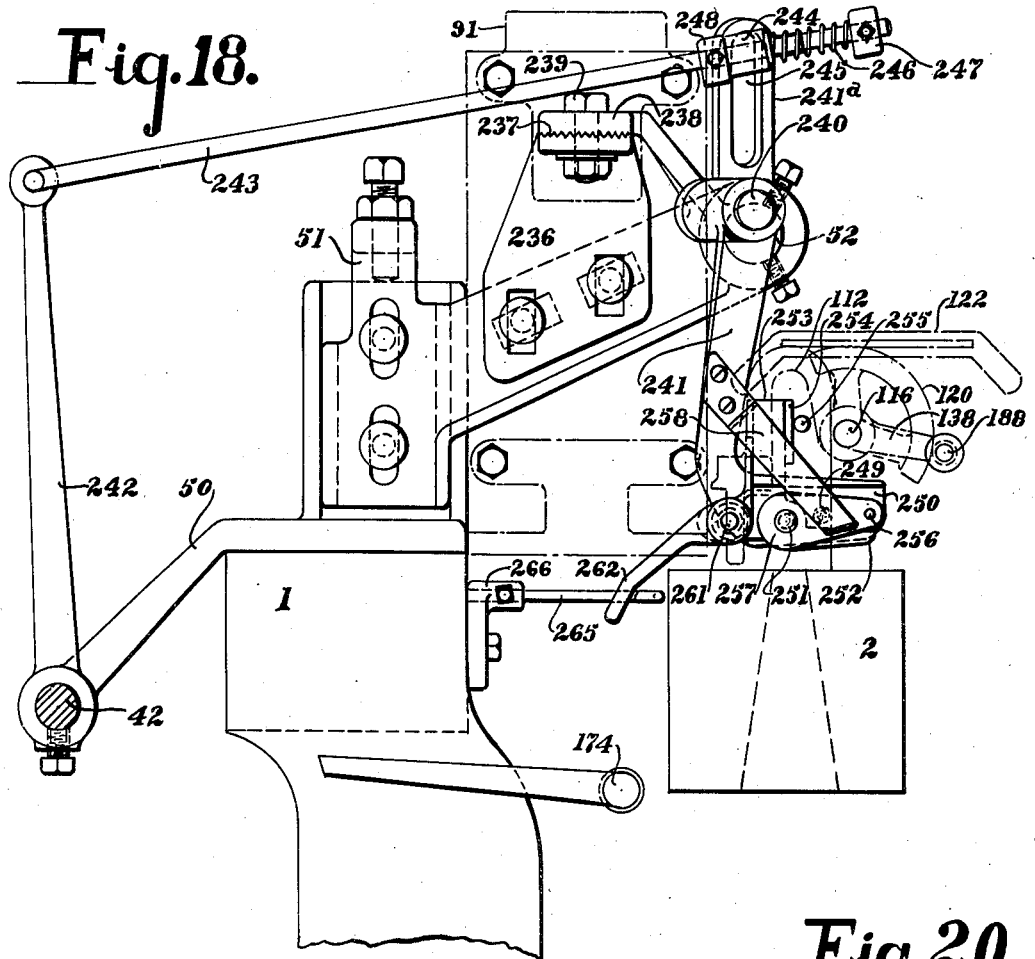
Fig. 18 is an end elevation showing the weft cutter.
Figure 19:
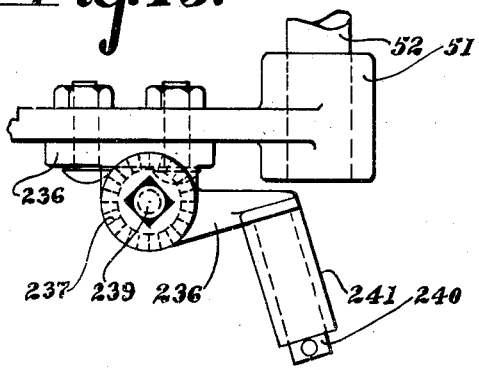
Fig. 19 is a fragmentary plan view of the weft cutter adjustment.
Figure 20:
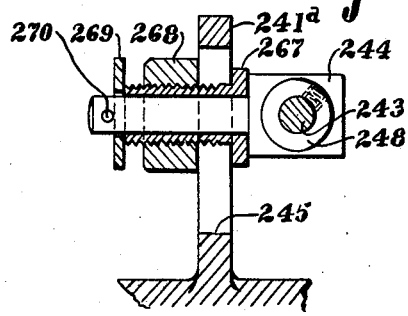
Fig. 20 is a fragmentary section showing the cutter operating rod.

On the cross shaft 42 is conveniently mounted an upright arm 242, at the upper end of this arm is a link rod 243 which transmits rocking movement from the shaft 42 to the cutter 241 through the swivel 244, which is clamped in proper position in the slot 245 by the sleeve 267 and nut 268 Fig. 20, and has a washer 269 and cross pin 270 to loosely hold the swivel 244 in place in the projection 241a of the cutter body 241. On the link rod 243 is mounted a compression spring 246 and the adjusting collar 247 to hold the spring with proper tension on the adjusting collar 248 to limit the action of the spring and hold the parts in proper working position. At the lower end of the cutter body 241 is fastened by a screw 249, the fixed cutter blade 250 Figs. 18—21 and 22, and fulcrumed on the screw 251 is the movable or shear blade 252. There is a small spiral spring 260 around the fulcrum screw 251, shown in dotted lines Fig. 22, adapted to assist in keeping the cutter blades 250 and 252 together to produce the cutting of the weft of the outgoing shuttle. There is an angular projection 253 on this cutter extending upward, and having a closer plate 254 riveted to the side thereof to present a relatively broad wearing surface to the closer pin 255 firmly set into the mouthpiece 256 mounted on the lay in the usual way Fig. 22 to close the cutter and sever the weft during replenishment. On this closer plate 254 is a projection 254a Fig. 22, which acts as a stop and limits the movement of the shear blade 252. Loosely mounted on the fulcrum screw 251 and the positioning pin 256 Figs. 18 and 22 is a clamping plate 257 of indurated material. This plate fits snugly to the shear blade 252, and is held against it by the flat spring 258 which is screwed to the cutter body 241 by machine screws 259 supplying the necessary friction to hold the thread until it is cut again by the selvage cutter to be described. Mounted on the cutter body 241 on the fulcrum 261 is the cutter opener lever 262 composed of a hub or fulcrum part, an upright member 263 to open the cutter when required and the lower member 262. This cutter opener is moved in one direction by the coil spring 264 Fig. 21, to keep the member 263 always against the weft cutter upright member 253 to avoid wear due to vibration as the loom runs. Mounted on the loom frame or other convenient fixed part is the cutter opener 265, through the medium of the adjustable bracket 266, Fig. 22. After the shuttle replenishment has taken place, and as the train of levers actuated by the cam 43, Fig. 4 returns the cutter to normal or running position, the lower member 262 slides by the cutter opener 265, and is then in position for the next feeler actuation. It will be noted by the construction and positioning of the members 262 and 265, that the shear blade will be opened gradually through the inward movement of the cutter, thereby eliminating the usual abrupt action of the cutter, and avoiding excessive strain of the controlling levers. The bracket 110 Figs. 21 and 22 has a recess shown as 110a which enables the weft cutter to move a sufficient distance over the shuttle race to secure the weft from the spent shuttle that is about to be ejected from the shuttle box.

Figure 23:
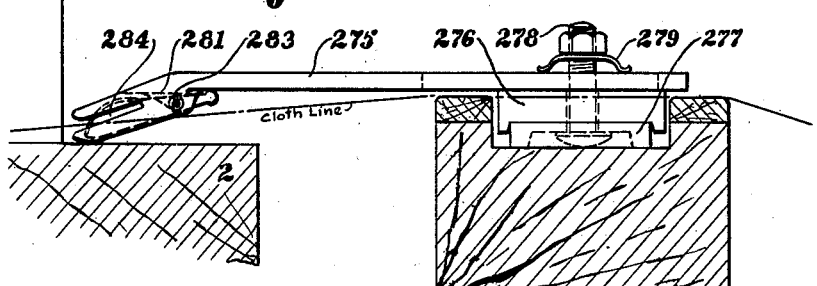
Fig. 23 is a section on line B—B in Fig. 21 showing a side elevation of the selvage cutter.
Figure 24:
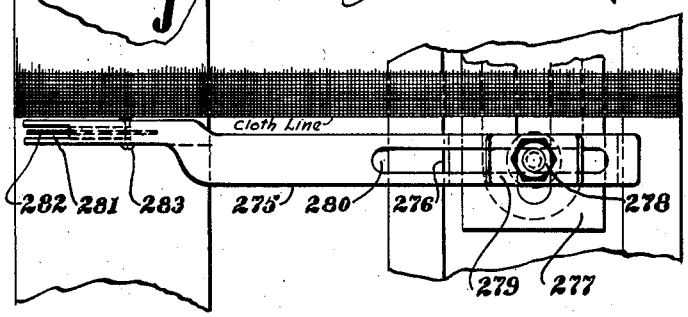
Fig. 24 is a top plan view of Fig. 23.
Figure 25:
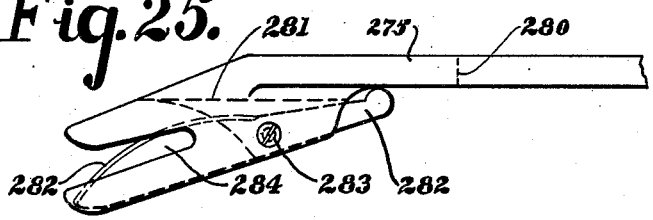
Fig. 25 is an enlarged side view of the selvage cutter.

On many fabrics of light and delicate nature it has been found advisable to omit the temples, and on such looms some other means is needed to sever the weft ends left by the outgoing and the incoming shuttles. The selvage cutter shown in Figs. 23—24 and 25 has been designed for this purpose. It consists essentially of a yieldingly and adjustably mounted holder 275 on a sliding bracket 276 screwed to the loom frame or breast beam by the mounting 277 let into said breast beam as shown and held in any desired position by the bolt 278, and the flat spring 279. The bolt 278 passes through the slot 280 Fig. 24, and allows the cutter to slip back away from the reed in the event of a shuttle being out of the box, and in the path of the cutter as the lay beats up. When this occurs the cutter must be replaced manually. On the inner or reed end of this cutter, a cavity 281 has been formed to receive the sharp blade 282 which is so held by the pin 283 as to be easily removed for sharpening or replacement. A transverse opening 284 is so arranged to allow the weft protruding from the selvage, that is held by the other weft cutter previously described, and the weft from the incoming shuttle, to advance into this opening as the fabric is woven and drawn across the sharp edge of the cutter blade and the edges of the cavity in which the blade is confined, thereby severing both of the weft ends very close to the selvage of the cloth. The construction of the blade and holder are such as to give ready access to the weft to be cut, and also to protect the operatives from injury due to coming in contact with the blade.

The operation of this shuttle changing loom is as follows: As the shuttle arrives in a cell of the shifting shuttle box, the action of the box motion raises or lowers the box cell away from the level of the race. This movement causes one of the feelers to contact the weft on the bobbin in the shuttle. When the weft on the bobbin becomes substantially exhausted, the contacting feeler slips longitudinally positioning the striker pin 9 to contact the striker plate 18 Figs. 4-5-6-7-8 and 9. On the next forward beat of the lay, of the next pick the contact is effected, transmitting movement to the lifter wire 34 which raises the latch 40 into the path of the contacting pawl 48 on the upright arm 47. Another shuttle on the level of the race is then picked into the other cell of the shifting shuttle box where it is moved away from the level of the race by the box motion for feeler contact. The shuttle containing the substantially exhausted weft bobbin then arrives in the shuttle box on the magazine side of the loom as the main lever 45 moves the upright arm 47 away from the lay, engaging the latch 40 through the pawl 48 thereby moving the cross shaft 42. During this operation the lifter finger 41a is forced down depressing the lifter wire 34 thereby resetting the parts for the next feeler indication. It will be noted by the drawings Fig. 1, that the cross shaft 42 controls four distinct operations through shafts and levers attached thereto simultaneously. The movement of the cross shaft 42 causes the spent shuttle to be ejected and replaced by a replenished one by the following means. The cross shaft 42 through the upright arm 242 and the link rod 243 Fig. 18, moves the cutter into position, and through this movement opens the shear blade 252 as heretofore described. As the lay approaches front center the closer pin 255 Figs. 21 and 22, fastened in the mouthpiece 256 mounted on the lay engages the closer plate 254 closing the shear blade, thereby severing the weft of the spent shuttle, the means provided on the cutter holding the weft until severed by the selvage cutter.

The movement of the cross shaft 42 Figs. 1 and 10 also raises the lever 69 attached thereto, and this lever raises the selector 66 fastened to the other end, as it oscillates under the shuttle release members 70 and 71. The oscillating movement of the selector 66 is derived from the box motion operating mechanism, and is transmitted across the loom by the selector shaft 59a as previously described. This oscillating movement being controlled by the box motion insures that the weft replenishment will correspond with the weft in the shuttle that is on the level of the race. As the selector 66 is raised it engages the shuttle release member indicated for replenishment, said member having a lug which in turn engages a spiral wing connected to the shuttle release shaft located on the inner side of the magazine. This shaft is connected to a similar shaft on the outer end of the magazine by adjustable connectors and connecting rod to operate in unison. Each of these release shafts has two wings located at the lower end. The bottom wings, as the shafts turn release the shuttle in the magazine compartment selected allowing it to drop upon the supporting members 216 Fig. 11, positioned under the magazine. The top wings of the release shafts simultaneously engage the tips of the next above shuttle during this operation holding same thereby allowing but one shuttle to transfer at a time.

Fastened to the cross shaft 42 is the lever 229 Fig. 1. As the cross shaft moves this lever is elevated into the path of the locking lever 224, that opens the shuttle box lock.

The arm 144 on the cross shaft 42 through the link 143, toggle lifter 142 and toggle 139 cause the main cam 134 to move the main operating lever 140. Connected to the lever 140 is the upright connecting rod 147 extending and attached to the arm 133 on the shuttle box shaft 116. The lever 140 by this means turns the shaft 116 Fig. 10, moving the gear segments in their racks causing the shuttle box to recede. The spent shuttle is thereby forced backward away from the reed line. On the shuttle box shaft 116 Figs. 13 and 17, the box back 128 and the binder 124 are fastened, and they turn upward with the rotation of this shaft to permit the spent shuttle to drop out into the receptacle provided.

The main operating lever 140 Fig. 1 through the arm 151 and connecting rod 154 pulls the placer 155 through the opening between the supporting members 216 below the shuttle magazine. The placer there comes in contact with the replenished shuttle pushing it onto the race. As the shuttle box recedes the normal front of the shuttle box comes into line with the reed and serves as the box back for the replenished shuttle, the placer plate 193 Figs. 13 and 17 now forming the front of the box until the replenished shuttle has been picked out. The placer is moved in by the action of the operating levers until the placer hook 204 engages the detent 215 on the under side of the lay to lock and move the placer with the lay until the replenished shuttle is picked out. Then the placer through the mechanism provided engages the stop that is fastened to the magazine releasing the hook. The spring 171 Fig. 1 attached to the main operating lever 140 causes the train of levers to return to normal position after the main cam 134 has passed by, and in so doing returns the shuttle box to its normal position where it is locked, and returns the placer to its normal or running position.

The passing of the cam 43 Fig. 4 through its train of levers terminating in the shaft 42 return to normal or running position the parts controlled by said cam thereby completing the cycle of the weft changing operations.

The selvage cutter positioned on a fixed part of the loom receives and severs the extending weft ends as the cloth weaves down.

Having thus described my invention, what I claim is:—

1. In a shuttle changing loom operating with a plurality of shuttles, a magazine, a shuttle placer, a vibratable shuttle box adjacent said magazine, operating mechanism to vibrate the shuttle box and placer simultaneously at weft replenishment to change shuttles comprising an operating cam and armed lever having frontward upright and rearward extending arms, fulcrumed on the loom frame, connections to vibrate the shuttle box on the frontward extending arm, shuttle placer connections on the upright arm, a roller supporting member fulcrumed on the rearward extending arm, and means controlled by the weft replenishing mechanism to position said roller in the path of the operating cam to move the armed lever on its fulcrum during cam contact.

2. In a loom of the character described, a lay, a shuttle box, means to vibrate said shuttle box transversely of the lay upon call for weft replenishment to effect shuttle changing, racks mounted on the lay adjacent the ends of the shuttle box, gear segments on the shuttle box associated with said racks, and adjustable means mounted on the racks to engage and limit the movement of the gear segments when the shuttle box vibrates to change shuttles substantially as described.

3. In a weft replenishing loom of the character described, a lay, a laterally movable shuttle box mounted on the lay, a magazine and a shuttle placer adjacent the laterally movable box, a cam, operative means to move the box and vibrate the placer simultaneously during cam contact, said shuttle box having displaceable front and rear walls, means incorporated in the shuttle box ends in engagement with projections on the lay to partially rotate the rear wall as the front wall recedes to eject a spent shuttle and receive the shuttle of the placer, and means to restore the shuttle box walls to normal position after the shuttle of the placer has become operative.

4. In a weft replenishing loom of the character described, a lay, a shuttle box comprising associated front and rear walls supported to vibrate transversely of the lay, a magazine and a shuttle placer adjacent said shuttle box, operative means to move the shuttle box and vibrate the placer simultaneously at weft replenishment, racks on the lay at each end of the box, gear segments mounted at the ends of one box wall associated with said racks to partially rotate said box wall and displace the associated wall to eject a spent shuttle and receive the shuttle of the placer as the box vibrates, and means to restore both box walls to normal position after the shuttle of the placer becomes operative.

5. In a shuttle changing loom of the character described, a lay, a single cell vibratable shuttle box mounted on the lay, a magazine and a shuttle placer adjacent said single box, means to vibrate the shuttle box and placer at predetermined times, a detent on the lay, a hook mounted on the placer to engage said detent on the lay to lock said placer to the lay during shuttle transfer, a rocking cam mounted on the placer in operative engagement with the hook, and means mounted on the magazine to cause the cam to rock to release the hook as the lay returns the placer to normal position.

6. In a weft replenishing loom operating with a plurality of shuttles containing distinctive weft, a change box motion equipped with weft detecting devices for each cell, weft replenishing mechanism, a single cell vibratable shuttle box and a supply magazine with a plurality of compartments on the side of the loom opposed to the change box motion, said magazine having shuttle sustaining and shuttle release members in each compartment, a shuttle selector mounted adjacent said release members, means controlled by the box motion to oscillate the selector in relation to the release members comprising a shaft extending across the loom, an arm mounted on the magazine ends of said shaft having a horizontal slot to receive the selector, a box motion connection at the opposite end of the shaft to rock said shaft as the box motion progresses, and means cooperating with the weft replenishing mechanism to raise the selector to engage a release member in a shuttle compartment containing weft corresponding to that of the exhausted shuttle.

7. In a loom of the character described having shuttle changing mechanism to supply weft corresponding to that exhausted, a magazine having more than one compartment, vertical shafts at the ends of each compartment having shuttle sustaining members extending horizontally into the lower ends of each compartment said sustaining members spaced apart the distance of a shuttle and in staggered relation, connections to rotate the vertical shafts in unison, a vertically sliding release member associated with a shaft of each compartment and means to actuate a release member of a compartment containing weft corresponding to that exhausted as required.

8. In a multicolor shuttle changing loom, a lay, weft exhaustion indicating devices, a shuttle box on the lay which vibrates to change shuttles, controlling means therefor, a locking device on said box, a member on the lay cooperating therewith effective to lock the box to the lay during normal operation of the loom, means to release said device at weft replenishment, shuttle supplying mechanism for said shuttle box, means in said mechanism to select weft corresponding to that to be discarded, cutting mechanism for the weft to be discarded, positioning means therefor, and a single member supporting connections to all the aforesaid means, and responsive during the operation of said weft exhaustion indicating devices to initiate the operation of all the aforesaid means simultaneously.

9. In a shuttle changing loom, weft replenishing mechanism, a lay, a plurality of shuttles on the lay, a vibratable shuttle box cooperating therewith having a rotatable wall, means to move said wall when the box vibrates to change shuttles, a locking member associated with said wall, a cooperating detent on the lay to engage and lock said member to the lay to prevent movement of said wall during normal operation of the loom, and means responsive to the replenishing mechanism to release said detent from said member upon call for shuttle change to permit movement of said wall.

WILLIAM H. BAKER.